United States Patent Office 3,707,481
Patented Dec. 26, 1972

---

3,707,481
PROCESS FOR PREPARING CYCLIC COMPOUNDS
Joseph T. Arrigo, Mount Prospect, and Allen K. Sparks, Des Plaines, Ill., assignors to Universal Oil Products Company, Des Plaines, Ill.
No Drawing. Filed Nov. 4, 1969, Ser. No. 874,069
Int. Cl. C07d 7/24
U.S. Cl. 260—343.2 R     5 Claims

ABSTRACT OF THE DISCLOSURE

Cyclic compounds are prepared by treating an aryl-substituted unsaturated compound at reaction conditions which include a temperature in the range of from about 50° to about 250° C. and a pressure in the range of from about atmospheric to about 500 atmospheres in the presence of a compound containing a metal selected from Group VIII of the Periodic Table.

---

This invention relates to a process for preparing cyclic compounds, and more particularly, to a process for preparing cyclic compounds which contain at least two rings. More specifically, the invention is concerned with a catalytic process for the cyclization of unsaturated compounds which contain an aryl substituent, the cyclicized compounds being useful in the chemical industry.

The cyclicized compounds which are prepared according to the process of this invention will be useful as intermediates in the preparation of aroma chemicals, a specific example of the cyclicized compounds being coumarin which possesses a fragrant odor similar to vanilla and which is used as a deodorizing and odor enhancing agent in perfumes, soaps, tobacco, inks, rubber and other products where aromatic ingredients are required.

Coumarin which has a bitter, stinging taste with an odor and flavor similar to vanillin or vanilla is reported to have three times the flavoring strength of vanillin on a weight basis, imparting a vanilla-butter flavor to bakery products such as, for example, biscuits, cookies and cakes where the somewhat low volatility of coumarin is advantageous, the heat volatilizing the compound and thus releasing the aromatic properties or odors. In addition, coumarin is also used for men's toiletries such as colognes, aftershave lotions, soaps, etc. where it imparts a woody type of fragrance to the toiletry. Furthermore, coumarin is also used to enhance the aroma properties for such fragrances as synthetic lavender, lilac and rose perfumes.

Heretofore, the source of coumarin from a natural state has been from tonka beans. However, the extraction of coumarin from these tonka beans can be a relatively lengthy and expensive procedure inasmuch as the beans are usually cured and thereafter they are heated, followed by a condensation of the volatile components including coumarin. The ground beans may also be admixed with a volatile solvent followed by distillation of the solvent from the extract to recover the desired coumarin. However, this source of coumarin is dependent upon the whims and vagaries of nature, and the crop of tonka beans may vary from year to year depending upon the climatic conditions attendant upon the region in which the tonka beans are grown.

Industrial coumrain may be prepared synthetically, the prior art showing the treatment of phenol with chloroform and a strong alkali to form an intermediate, salicylaldehyde, which is thereafter converted to coumarin. Likewise, o-cresol has been treated with phosgene in the presence of a base to form o-cresol carbonate. This compound is then chlorinated to o-(dichloromethyl)phenyl carbonate which is then converted to o-(diacetoxymethyl)phenyl carbonate utilizing sodium acetate and cobalt chloride. Additional steps are then performed after treatment of this compound with acetic anhydride to form the desired coumarin.

In contradistinction to these prior art processes, it has now been discovered that unsaturated compounds containing an aryl substituent may be treated at reaction conditions in a manner hereinafter set forth in greater detail in a one-step process to form a polycyclic compound which possesses valuable chemical characteristics.

It is therefore an object of this invention to provide a process for the cyclization of aryl-substituted unsaturated compounds utilizing certain catalytic compositions of matter to effect the reaction.

In one aspect an embodiment of this invention resides in a process for the preparation of a cyclic compound which comprises treating an aryl-substituted unsaturated compound possessing the generic formula

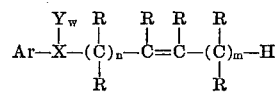

in which Ar is a mono- or polycyclic hydrocarbon nucleus, X is selected from the group consisting of arylene, alkylene of from 1 to about 30 carbon atoms, sulfur, oxygen, nitrogen, phosphorus, silicon, keto, carboalkoxy, carboxy, sulfinyl and sulfonyl radicals, Y is hydrocarbyl radical of from 1 to about 10 carbon atoms, R is independently selected from the group consisting of hydrogen and hydrocarbyl radicals of from 1 to about 10 carbon atoms, w is an integer of from 0 to 2, m and n are integers of from 0 to 10, at reaction condition in the presence of a compound containing a metal selected from Group VIII of the Periodic Table, and recovering the resultant cyclic compound.

A specific embodiment of this invention is found in a process for the preparation of a cyclic compound which comprises treating phenyl acrylate at a temperature in the range of from about 50° to about 250° C. and at an air pressure in the range of from atmospheric to about 500 atmospheres in the presence of a catalyst comprising palladium acetylacetonate and cupric acetate, and recovering the desired coumarin.

Other objects and embodiments will be found in the following further detailed description of the present invention.

As hereinbefore set forth the present invention is concerned with a process for preparing polycyclic compounds utilizing, as the starting material therefor, an aryl-substituted unsaturated compound. The desired compounds are prepared by treating the starting material in the presence of a metal-containing compound of the type hereinafter set forth and an organic solvent. In addition, it is also contemplated within the scope of this invention that the process may also be effected in a catalytic manner using a catalyst of the type hereinafter set forth in greater detail and in the presence of an oxygen-containing gas, this method of preparation being the preferred embodiment.

Examples of aryl-substituted unsaturated compounds which may be treated according to the process hereinafter set forth will possess the generic formula

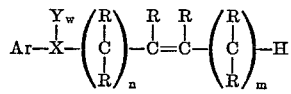

in which Ar is a mono- or polycyclic hydrocarbon nucleus, X is selected from the groups consisting of arylene, alkylene of from 1 to about 30 carbon atoms, sulfur, oxygen, nitrogen, phosphorus, silicon, keto, carboalkoxy, carboxy, sulfinyl and sulfonyl radicals, Y is a hydrocarbyl radical of from 1 to about 10 carbon atoms, R is independently selected from the group consisting of hydrogen and hydrocarbyl radicals of from 1 to about 10 carbon atoms, $w$ is an integer of from 0 to 2, and $m$ and $n$ are integers of from 0 to 10. Specific examples of these compounds will include vinyl phenyl ketone, allyl phenyl ketone, propenyl phenyl ketone, crotyl phenyl ketone, vinyl phenyl ether, allyl phenyl ether, crotyl phenyl ether, phenyl acrylate, phenyl 3-butenoate, vinyl benzoate, allyl benzoate, 3-butenyl benzoate, vinyl phenyl sulfide, allyl phenyl sulfide, phenyl thioacrylate, phenyl thio-3-butenoate, phenyl thio-4-pentenoate, phenyl thiocrotonate, N-methyl-N-vinylaniline, N-methyl-N-allylaniline, N-methyl-N-crotylaniline, N-methylacrylanilide, N-methylcrotonanilide, N-methyl - 3 - butenanilide, methylvinylphenylphos-N - methyl - 3 - butenanilide, methylvinylphenylphosphine, methylallylphenylphosphine, methylcrotylphenylphosphine, vinyl phenyl sulfoxide, allyl phenyl sulfoxide, 3-butenyl phenyl sulfide, vinyl phenyl sulfone, allyl phenyl sulfone, crotyl phenyl sulfone, vinyl triphenylsilane, allyl triphenylsilane, crotyl triphenylsilane, 2-vinylbiphenyl, 2-allylbiphenyl, vinyl 2-biphenyl ketone, vinyl 2-biphenyl ether, allyl 2-biphenyl ether, 2-acryloxybiphenyl, 2-crotonoxybiphenyl, vinyl p-tolyl ketone, allyl p-tolyl ketone, vinyl p-tolyl ether, allyl p-tolyl ether, p-cresyl acrylate, vinyl p-anisyl ether, allyl p-anisyl ether, p-methoxyphenyl acrylate, p-methoxyphenyl crotonate, vinyl naphthyl ketone, allyl naphthyl ketone, propenyl naphthyl ketone, crotyl naphthyl ketone, vinyl naphthyl ether, allyl naphthyl ether, crotyl naphthyl ether, 2-acryloxynaphthalene, 2-crotonoxynaphthalene, 2-vinyl naphthanoate, 2-allyl naphthanoate, 2-(3-butenyl) naphthanoate, vinyl 2-naphthyl sulfide, allyl 2-naphthyl sulfide, (N-methyl-N-vinyl)-2-naphthylamine, (N-methyl-N-allyl)-2 - naphthylamine, (N-methyl-N-crotyl)-2-naphthylamine, the corresponding anthracenes, phenanthrenes, chrysenes, pyrenes, etc. It is to be understood that the aforementioned aryl-substituted unsaturated compounds are only representative of the class of compounds which may be utilized as the starting materials, and that the present invention is not necessarily limited thereto.

The treatment of the aforementioned aryl-substituted unsaturated compounds of the type hereinbefore set forth in greater detail is effected in the presence of a composition of matter comprising a metal or a salt of a metal selected from the metals of Group VIII of the Periodic Table. The preferred salts of these metals comprise the acetates and acetylacetonates. Specific examples of these salts will include platinum acetate, platinum acetylacetonate, palladium acetate, palladium acetylacetonate, rhodium acetate, rhodium acetylacetonate, ruthenium acetate, ruthenium acetylacetonate, osmium acetate, osmium acetylacetonate, iridium acetate, iridium acetylacetonate, nickel acetate, nickel acetylacetonate, etc. In addition, if so desired, the reaction is effected in an organic solvent which may comprise dimethylformamide, dimethyl sulfoxide, acetonitrile, alkanoic acids containing from two to about five carbon atoms such as acetic acid, propionic acid, butyric acid, valeric acid, etc., alkyl ketones containing from three to about six carbon atoms such as acetone, methyl ethyl ketone, diethyl ketone, ethyl propyl ketone, etc. or esters such as ethyl acetate, etc.

In addition, it is also contemplated within the scope of this invention that the reaction may be effected in a catalytic manner. When such a modification of the process is utilized, the reaction may be carried out using a catalytic amount of a metal or a salt thereof, said metal being selected from the group consisting of copper, cobalt, nickel, iron, manganese, chromium, vanadium, titanium, thallium, thin, antimony, and mercury, the preferred salts being the acetates and acetylacetonates thereof. Specific examples of these salts include copper acetate, copper acetylacetonate, cobalt acetate, cobalt acetylacetonate, nickel acetate, nickel acetylacetonate, iron acetate, iron acetylacetonate, manganese acetate, manganese acetylacetonate, chromium acetate, chromium acetylacetonate, vanadium cetate, vanadium acetylacetonate, titanium acetate, titanium acetylacetonate, thallium acetate, thallium acetylacetonate, tin acetate, tin acetylacetonate, antimony acetate, antimony acetylacetonate, mercury acetate, and mercury acetylacetonate.

The reaction conditions under which this reaction is effected will include temperatures ranging from about ambient (about 25° C.) to about 250° C. or more. In addition, if so desired, the reaction is effected in the presence of an oxygen-containing gas such as oxygen or air, the latter being preferred due to the greater availability and lower cost thereof. The reaction pressures which will be used will range from about 1 to about 500 atmospheres, the pressure being supplied by the oxygen-containing gas. However, it is contemplated within the scope of this invention that the oxygen-containing gas may only afford a partial pressure of the desired reaction pressure, the remainder of the pressure being provided for by the introduction of a substantially inert gas such as nitrogen into the reaction zone.

The process of this invention may be effected in any suitable manner and may comprise either a batch or continuuous-type operation. For example, when a batch-type operation is used, a quantity of the aryl-substituted unsaturated compound is placed in an appropriate apparatus along with the metal or salt of the metal of the type hereinbefore set forth. In addition, if so desired, an organic solvent such as acetic acid and the catalyst comprising a metal or a salt thereof are also placed in the apparatus. This apparatus may, in the preferred embodiment of the invention, comprise an autoclave of the rotating or stirred type. The autoclave is sealed, and oxygen-containing gas is charged thereto and the apparatus is then heated to the desired operating temperature. After maintaining the autoclave at the desired temperature and pressure for a predetermined residence time which may range from 0.5 up to about 48 hours or more in duration, heating is discontinued. The apparatus and contents thereof are allowed to return to room temperature, the excess pressure is vented and the reaction product is recovered. The product is then subjected to conventional means of separation and purification such as filtration to separate the metal salt followed by washing with water, drying over sodium sulfate, evaporation, fractional crystallization, fractional distillation, etc. whereby the desired product comprising a polycyclic compound is recovered.

It is also contemplated within the scope of this invention that this process may be effected in a continuous manner of operation. When such a type of operation is used, the desired aryl-substituted unsaturated compound comprising the starting material is continuously charged to a reactor which is maintained at the desired operating conditions of temperature and pressure. The reactor will contain a metal or a salt of a metal of the type hereinbefore set forth, a specific example of this being palladium acetate, and, if so desired, a catalyst of the type also hereinbefore set forth in greater detail. In addition, an organic solvent such as acetic acid is also continuously charged to the reactor. Alternatively, the solvent may be charged to the reactor through a separate line or admixed with the reactant prior to entry into said reactor. Upon completion of the desired residence time, the reactor effluent is continuously withdrawn from the reactor and subjected to a separation step. In said step the desired product is separated from unreacted aromatic compound, solvent and a solution of the catalyst dissolved in higher boiling by-products, the latter being recycled to the reactor to be blended with an additional amount of aromatic compound and solvent, while the former is subjected to subsequent purification steps whereby the desired product is recovered in a substantially pure form. When utilizing a catalytic operation to effect the process of this invention in a continuous manner, the process may be effected in various ways. One such method is to utilize the catalyst composited on a solid inert support as a fixed bed in the reactor and pass the reactants through said catalyst bed in either an upward or downward flow. Another method of effecting the reaction is to utilize the supported catalyst in a moving bed type of operation whereby the reactants and the catalyst pass through the reaction zone either concurrently or countercurrently to each other. Yet another method is to pass the supported catalyst into the reaction zone as a slurry in one or both of the reactants.

Some representative examples of the type of polycyclic compounds which may be prepared according to the process of this invention will include indenone, 1-keto-1,2-dihydronaphthalene, 3-methyl-1-indenone, 3-ethyl-1-indenone, 3-propyl-1-indenone, 4-methyl-1-keto-1,2-dihydronaphthalene, 4-ethyl - 1 - keto-1,2-dihydronaphthalene, 3-chromene, benzofuran, coumarin, isocoumarin, 6-methylcoumarin, 6-t-butylcoumarin, 4-methylcoumarin, benzothiophene, 1-thiocoumarin, N-methylindole, N-methyl-1,2-dihydroquinoline, benzothiophene dioxide, etc. It is to be understood that the aforementioned compounds are only representative of the class of compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example 100 mmoles of phenyl acrylate, 2 mmoles of palladium acetylacetonate, 2 mmoles of cupric acetate, 1.23 moles of acetic acid and 2 g. of an internal standard comprising n-dodecane were placed in a 300 ml. magnetically-stirred, stainless steel autoclave. The autoclave was sealed and 1175 p.s.i.g. of air was pressed in. The autoclave was heated to a temperature of 120° C. and stirred for a period of 4 hours, the pressure rising to 1500 p.s.i.g. at the reaction temperature. At the end of this time heating was discontinued, the autoclave was allowed to return to room temperature and the excess pressure was discharged. The reaction mixture was recovered, acetic acid and other light ends were removed utilizing a rotating vacuum-flashing apparatus on a steam bath. The remaining liquid was distilled under reduced pressure and the cut boiling at around 300° C. corrected to 760 mm. pressure was recovered. Preparative gas-liquid chromatography and mass spectrometry showed that the major component of this cut which had a melting point of 67–70° C. was coumarin which is reported to have a melting point of 70° C. and a boiling point of 290–291° C.

EXAMPLE II

A mixture comprising 100 mmoles of p-cresyl acrylate, 2 mmoles of palladium acetate, 2 mmoles of cupric acetate, 1.25 moles of acetic acid and 2 g. of normal n-dodecane which acts as an internal standard is placed in a 300 ml. magnetically-stirred, stainless steel autoclave. The vessel is sealed and air is pressed in until an initial pressure of 1200 p.s.i.g. is reached. Thereafter the vessel is heated to a temperature of 120° C. and stirred at this temperature for a period of 6 hours. At the end of this time heating is discontinued, the vessel is allowed to return to room temperature and the excess pressure is discharged. The vessel is opened and the reaction mixture is recovered therefrom. A gas-liquid chromatographic analysis of the mixture discloses the presence of 6-methylcoumarin.

EXAMPLE III

As an illustration of a modification of the present invention, another experiment is run in which 0.25 mole of N-methyl-N-vinylaniline, 2.0 moles of acetic acid, 0.01 mole of palladium acetate and 2 g. of n-dodecane are charged to a flask provided with heating, stirring and reflux means. The mixture is refluxed for a period of about 5 hours at a temperature of about 120° C. At the end of this time heating is discontinued and the reaction mixture is recovered. The mixture is filtered, made alkaline with sodium hydroxide, extracted with ether and the extract is dried over sodium sulphate and again filtered. N-methylindole is isolated by distillation of the ether extract.

EXAMPLE IV

In this example 100 mmoles of phenyl vinyl ether, 0.5 mole of acetic acid and a catalyst system comprising 2 mmoles of platinum acetylacetonate and 2 mmoles of cupric acetate along with 2 g. of an internal standard comprising n-dodecane are charged to a glass liner of a rotating autoclave. The autoclave is sealed and air is pressed in until an initial pressure of 1200 p.s.i.g. is reached. The autoclave is heated to a temperature of 150° C. and maintained thereat for a period of 6 hours. At the end of this time heating is discontinued and after allowing the autoclave to return to room temperature, the excess pressure is vented. The reaction mixture is recovered, filtered to remove the catalyst and thereafter the filtrate is washed with water, dried and subjected to fractional distillation to remove the excess acetic acid. Analysis of the product will disclose that the desired product comprising benzofuran is present.

EXAMPLE V

A mixture consisting of 100 mmoles of vinyl benzoate, 1 mole of acetic acid, 2 mmoles of palladium acetylacetonate and 2 mmoles of cupric acetate along with 2 g. of n-dodecane is treated in a manner similar to that set forth in Example I above, that is, by being reacted in an autoclave at a temperature of about 120° C. and an air pressure of 1500 p.s.i.g. for a period of 4 hours. At the end of the aforementioned reaction time the autoclave is cooled, the excess pressure is discharged and the reaction mixture is recovered. The mixture is filtered to remove the catalyst following which the filtrate is washed with water, dried over sodium sulphate and is then subjected to distillation to remove the acetic acid. The presence of the desired product comprising isocoumarin is determined by means of a gas-liquid chromatographic analysis.

EXAMPLE VI

In this example a mixture of 0.25 mole of N-methyl-N-allylaniline, 2.0 moles of acetic acid, 0.01 mole of palladium acetate and 2 g. of an internal standard comprising n-dodecane is charged to a flask provided with heating, stirring and reflux means. The aforesaid mixture is then refluxed for a period of about 5 hours at the reflux temperature of 120° C. following which heating is discontinued and the reaction mixture, after cooling of the flask, is recovered. The recovered mixture is filtered, made alkaline with sodium hydroxide, extracted with ether following which the extract is dried over sodium sulphate and again filtered. The desired product comprising N-methyl-1,2-dihydroquinoline is isolated by fractional distillation of the ether extract.

We claim as our invention:

1. A process for cyclizing an aryl-substituted unsaturated compound having the formula

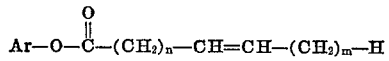

in which Ar is selected from the group consisting of phenyl, tolyl, anisyl, biphenyl and naphthyl, and $m$ and $n$ are integers of from 0 to 10, by treating said unsaturated compound at a temperature of about 50° to about 250° C. and a pressure of from 1 to about 500 atmospheres in the presence of a Group VIII metal salt, and recovering the resultant cyclic compound.

2. The process as set forth in claim 1 further characterized in that said process is effected in an organic solvent.

3. The process as set forth in claim 1 further characterized in that said process is effected in the presence of a free oxygen-containing gas and a copper salt.

4. The process as set forth in claim 1 in which said aryl-substituted unsubstituted unsaturated compound is phenyl acrylate and said cyclic compound is coumarin.

5. The process as set forth in claim 1 in which said aryl-substituted unsaturated compound is p-cresyl acrylate and said cyclic compound is 6-methylcoumarin.

References Cited
UNITED STATES PATENTS 3,651,091   3/1972   Boschetti et al. ----- 260—343.2

JOHN M. FORD, Primary Examiner

U.S. Cl. X.R.

252—522; 260—668 F, 319.1, 327 TH, 346.2 R, 283 R, 606.05 P